United States Patent
Foina (10) Patent No.: US 11,941,579 B2
(45) Date of Patent: Mar. 26, 2024

(54) AUTONOMOUS VEHICLES PERFORMING INVENTORY MANAGEMENT

(71) Applicant: Aislan Gomide Foina, El Cerrito, CA (US)

(72) Inventor: Aislan Gomide Foina, El Cerrito, CA (US)

(*) Notice: Subject to any disclaimer, the term of this patent is extended or adjusted under 35 U.S.C. 154(b) by 1074 days.

(21) Appl. No.: 16/967,396

(22) PCT Filed: Sep. 20, 2017

(86) PCT No.: PCT/US2017/052527
§ 371 (c)(1),
(2) Date: Aug. 4, 2020

(87) PCT Pub. No.: WO2018/057629
PCT Pub. Date: Mar. 29, 2018

(65) Prior Publication Data
US 2021/0216948 A1 Jul. 15, 2021

Related U.S. Application Data

(60) Provisional application No. 62/397,337, filed on Sep. 20, 2016.

(51) Int. Cl.
*G06Q 10/087* (2023.01)
*B64C 39/02* (2023.01)
(Continued)

(52) U.S. Cl.
CPC ......... *G06Q 10/087* (2013.01); *B64C 39/024* (2013.01); *G01C 5/06* (2013.01);
(Continued)

(58) Field of Classification Search
CPC .. G06Q 10/087; G06Q 10/0875; G06Q 10/08; G06Q 10/00; B64C 39/024;
(Continued)

(56) References Cited

U.S. PATENT DOCUMENTS

| 6,950,722 B2 | 9/2005 | Mountz |
| 7,646,336 B2 | 1/2010 | Tan et al. |

(Continued)

FOREIGN PATENT DOCUMENTS

| WO | 2004/069699 A2 | 8/2004 |
| WO | 2015035428 A2 | 3/2015 |
| WO | 2016096014 A1 | 6/2016 |

OTHER PUBLICATIONS

European Patent Office, Official Action of EP 17 853 817.9-1222, dated Jul. 13, 2021 in 8 pages.

(Continued)

*Primary Examiner* — A. Hunter Wilder
(74) *Attorney, Agent, or Firm* — Procopio, Cory, Hargreaves & Savitch LLP (57) ABSTRACT

An inventory management system managing a plurality of inventory items stored in a storage area. The inventory management system includes an autonomous vehicle configured to move within the storage area and a computing device communicatively coupled to the autonomous vehicle. The autonomous vehicle includes a beacon configured to facilitate detection of a current position of the autonomous vehicle based on signal triangulation, a sensor configured to detect information indicative of a number of inventory items at the current position of the autonomous vehicle, and a wireless data link configured to transmit a signal indicative of the number of inventory items. The computing device may detect a position of the autonomous vehicle based on the signal transmitted from the beacon, and update an inventory of the storage area based on the signal indicative of the number of inventory items.

13 Claims, 9 Drawing Sheets

(51) Int. Cl.
| | |
|---|---|
| *B64U 101/00* | (2023.01) |
| *G01C 5/06* | (2006.01) |
| *G01S 13/08* | (2006.01) |
| *G01S 15/08* | (2006.01) |
| *G01S 17/08* | (2006.01) |
| *G05D 1/00* | (2006.01) |
| *G05D 1/02* | (2020.01) |
| *G05D 1/03* | (2006.01) |
| *G06K 7/10* | (2006.01) |
| *H04W 4/029* | (2018.01) |

(52) U.S. Cl.
CPC .............. *G01S 13/08* (2013.01); *G01S 15/08* (2013.01); *G01S 17/08* (2013.01); *G05D 1/0202* (2013.01); *G05D 1/03* (2013.01); *G06K 7/10297* (2013.01); *G06K 7/10316* (2013.01); *G06K 7/10376* (2013.01); *G06K 7/10861* (2013.01); *H04W 4/029* (2018.02); *B64U 2101/00* (2023.01); *G06K 2007/10504* (2013.01)

(58) Field of Classification Search
CPC . G01C 5/06; G01S 13/08; G01S 15/08; G01S 17/08; G05D 1/0202; G05D 1/03; G05D 1/005; G06K 7/10297; G06K 7/10316; G06K 7/10376; G06K 7/10861; G06K 2007/10504; H04W 4/029; B64U 2101/00; G08G 5/0013; G08G 5/0021; G08G 5/006; G08G 5/0069

See application file for complete search history.

(56) References Cited

U.S. PATENT DOCUMENTS

| | | | |
|---|---|---|---|
| 7,693,757 | B2 | 4/2010 | Zimmerman |
| 8,326,451 | B2 | 12/2012 | Schantz et al. |
| 8,965,561 | B2 | 2/2015 | Jacobus et al. |
| 8,989,922 | B2 | 3/2015 | Jones et al. |
| 9,120,622 | B1 | 9/2015 | Elazary et al. |
| 9,129,251 | B2 | 9/2015 | Davidson |
| 9,305,280 | B1 | 4/2016 | Berg et al. |
| 10,157,452 | B1* | 12/2018 | Tighe ..................... G06T 5/006 |
| 2009/0138151 | A1 | 5/2009 | Smid et al. |
| 2014/0247116 | A1 | 9/2014 | Davidson |
| 2014/0354809 | A1* | 12/2014 | Shondel ................. H04N 7/185 348/144 |
| 2015/0120094 | A1 | 4/2015 | Kimchi et al. |
| 2016/0247116 | A1* | 8/2016 | Olivo ..................... B64D 47/04 |

OTHER PUBLICATIONS

International Search Report and Written Opinion for related International Application No. PCT/US2017/052527, dated Nov. 22, 2017 (11 pages).

* cited by examiner

AUTONOMOUS VEHICLES PERFORMING INVENTORY MANAGEMENT

CROSS-REFERENCE TO RELATED APPLICATIONS

This application is a U.S. National Stage entry of PCT Application No: PCT/US2017/052527 filed Sep. 20, 2017, which claims priority to U.S. Provisional Patent Application No. 62/397,337, filed Sep. 20, 2016, the contents of which are incorporated herein by reference.

BACKGROUND

Field of the Invention

The present disclosure relates to autonomous vehicles, and more specifically, to autonomous vehicles performing inventory management.

Related Art

Detecting and counting items in large warehouses or storage yards may be important to maintaining an inventory. Initially, related art systems have relied on manual inspection of pallet stacks or shelves to determine supplies. More recently, sensors, such as RFID tags, or bar codes have been integrated to increase the speed or accuracy of manual inspection. However, such systems still do not allow for continuous monitor or updating of inventory levels within the warehouse without requiring sensors be placed on every item or pallet. Existing systems do not provide an autonomous vehicle surveying the warehouse or storage yard in a continuous manner to update inventory levels.

SUMMARY OF DISCLOSURE

Aspects of the present application may include an inventory management system for managing a plurality of inventory items stored in a storage area. The inventory management system may include an autonomous vehicle configured to move within the storage area and a computing device communicatively coupled to the autonomous vehicle. The autonomous vehicle may include a beacon configured to facilitate detection of a current position of the autonomous vehicle based on signal triangulation, a sensor configured to detect information indicative of a number of inventory items at the current position of the autonomous vehicle, and a wireless data link configured to transmit a signal indicative of the number of inventory items. The computing device being configured to facilitate detection of a position of the autonomous vehicle based on the beacon, and update an inventory of the storage area based on the signal indicative of the number of inventory items.

Additional aspects of the present application may include an autonomous vehicle for moving within a storage area and provide updated counts of inventor items within the storage area. The autonomous vehicle may include a beacon configured to facilitate detection of a current position of the autonomous vehicle based on signal triangulation, at least one sensor configured to detect information indicative of a number of inventory items at the current position of the autonomous vehicle, and a wireless data link configured to transmit a signal indicative of the number of inventory items to a computing device communicatively coupled to the autonomous vehicle configured to update an inventory of the storage area based on the signal indicative of the number of inventory items.

Aspects of the present application may also include a method of performing an inventory of items stored within a storage area using an autonomous vehicle moving within the storage area. The method may include detecting a position of the autonomous vehicle within the storage area, measuring an altitude of autonomous vehicle and a distance between the autonomous vehicle and a stack of items stored within the storage area, calculating a number of items in the stack of items based on the measured altitude, the measured distance and the detected position of the autonomous vehicle, and updating inventory records based on the calculated number of items in the stack.

Further aspects of the present application may include an inventory management system for managing a plurality of inventory items stored in a storage area. The inventory management system may include an autonomous vehicle configured to move within the storage area and computing means communicatively coupled to the autonomous vehicle. The autonomous vehicle may include means detection of a current position of the autonomous vehicle based on signal triangulation, means for detecting information indicative of a number of inventory items at the current position of the autonomous vehicle, and means for transmit a signal indicative of the number of inventory items. The computing means may include be means for detecting a position of the autonomous vehicle based on the beacon, and means for updating an inventory of the storage area based on the signal indicative of the number of inventory items.

DETAILED DESCRIPTION

The following detailed description provides further details of the figures and example implementations of the present application. Reference numerals and descriptions of redundant elements between figures are omitted for clarity.

Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application.

As the market of unmanned aerial systems (UAS) (e.g., drones) has expanded, cheaper models, such as those controlled by smartphones, have become available by many commercial avenues allowing amateur pilots to own what once only belonged to professional companies. These cheaper models may have an elevated level of automation that may allow these vehicles to be capable of flying autonomously. By integrating these UASs with a real-time location system (RTLS), a UAS may be able to navigate indoor facilities with high precision.

As discussed below with respect to the example implementations below, merging a UAS with an RTLS and additional sensors, it may be possible to create a system where automated drones may navigate autonomously inside a warehouse or storage yard. The additional sensors onboard the drones may collect data about the position and quantity of pallets or boxes inside the warehouse or storage yard. Inventory software may then receive this data and generates a report containing the quantity and position of the products in the warehouse.

For example, an inventory management system (IMS) may manage data exchanged with the drone to generate a waypoint list where the drone needs to fly over. While the drone is flying, the IMS may receive the drone location from the RTLS system. Height data from an altitude sensor and the distance data measured by a range finder may be sent from the drone. The IMS may calculate the stack height based on the difference between the altitude and measured distance. In some example implementations, the drone can also do this calculation internally and send the stack height directly to the IMS. Additional specifics of example implementations are discussed in greater detail below with respect to the provided figures.

Figure 1:
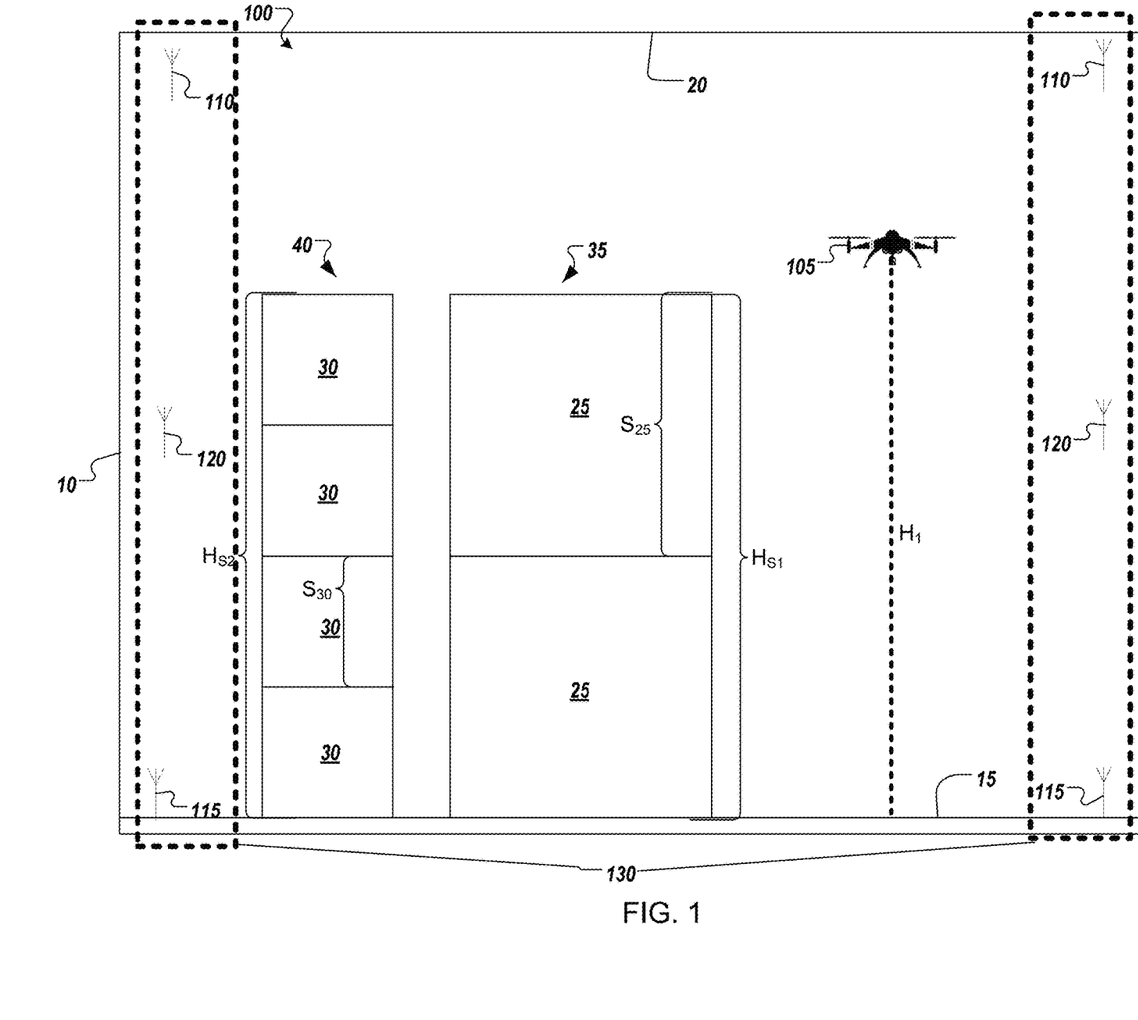
FIG. 1 illustrates a schematic representation of an inventory management system in accordance with example implementations of the present application.

FIG. 1 illustrates a schematic representation of an inventory management system (IMS) 100 in accordance with example implementations of the present application. The IMS 100 may be illustrated within a warehouse or other large building in FIG. 1. However, example implementations are not limited to this configuration and may be implemented in other environments as may be apparent to a person of ordinary skill in the art. For example, the IMS 100 may be used in open air stock yards such as lumber yards, junk yards, mineral yards, etc. In other example implementations, the IMS 100 may be used in vehicle storage or sale yards (e.g., car dealerships, car rental facilities, boat sales yards, recreational vehicle (RV) dealerships, or any other facility that might be apparent to a person of ordinary skill in the art).

Example implementations may also be used as part of attendance monitoring systems or site inspection systems. For example, implementations may be used to monitor attendance of a theme park, sports venue, concert venue, or other venue large numbers of people may be present. Additionally, example implementations may be used to inspect transportation infrastructure such as roads, rail lines, etc. to detect interruptions through height changes in the infrastructure.

As illustrated in FIG. 1, the IMS 100 has been installed in a warehouse 10 having a floor 15 and a ceiling 20. In some example implementations, the warehouse may not have a ceiling 20 and may be an open air storage environment, such as a lumber yard, storage yard, vehicle dealership, or other open air storage facility that might be apparent to a person of ordinary skill in the art.

Within the warehouse 10, a plurality of inventory items 25, 30 may be stored. The inventory items 25, 30 may be pallets, boxes, storage container or any other inventory storage structure that might be apparent to a person of ordinary skill in the art. The inventory items 25, 30 may also be an actual piece of inventory without a separate storage structure (e.g., a piece of equipment, vehicle, or other piece of inventory that might be apparent to a person of ordinary skill in the art).

The inventory items 25 may be positioned in stacks 35 with a standardized height ($H_{S1}$) and the inventory items 30 may be positioned in stacks 40 with a standardized height ($H_{S2}$). In some example implementations, the inventory items 25, 30 may be of two or more sizes allowing uniform standardized stacking heights (e.g., $H_{S1}=H_{S2}$). For example, inventory item 25 is illustrated as being larger than inventory item 30 such that stack 35 of two inventory items 25 is the same standardized height ($H_{S1}$) as a stack 40 of four inventory items 30 ($H_{S2}$). In other example implementations, the inventory items 25, 30 may be positioned in stacks 35, 40 having different standardized heights (e.g., $H_{S1} \neq H_{S2}$).

A stack 35, 40 may be considered a standardized stack of the maximum number of inventory items 25, 30 typically stored. In other words, the stack 35, 40 may be a standardized stack representing the maximum stack height before a new stack is started. The standardized height (HS1, $H_{S2}$) of the stack 35, 40 may be determined based on the maximum number ($N_{max1}$, $N_{max2}$) of inventory items 25, 30 that may be safely stacked and the size ($S_{25}$, $S_{30}$) of each inventory item 25, 30 in the stack 35, 40 using equations 1 and 2 below:

$$H_{S1}=N_{max1} \times S_{25} \qquad \text{(Equation 1)}$$

$$H_{S2}=N_{max2} \times S_{30} \qquad \text{(Equation 2)}$$

As illustrated, in some example implementations the size ($S_{25}$, $S_{30}$) may correspond to a unit height associated of each inventory item 25, 30. However, in other example implementations, the size ($S_{25}$, $S_{30}$) may correspond to a unit width, a unit volume or any other unit dimension associated with each inventory item 25, 30 that might be apparent to a person of ordinary skill in the art.

Figure 9:
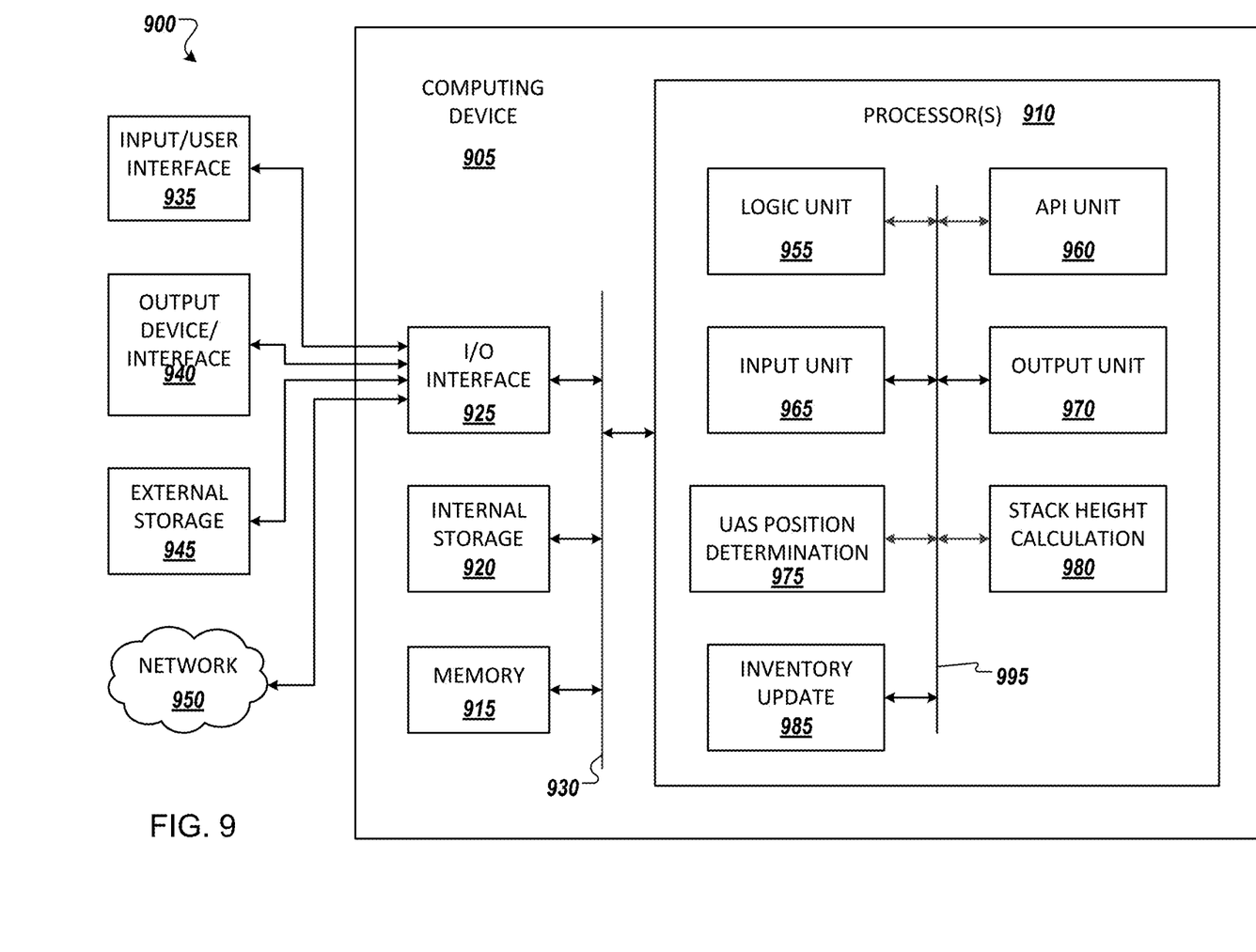
FIG. 9 illustrates an example computing environment with an example computer device suitable for controlling an inventory management system in accordance with some example implementations.

The standardized heights ($H_{S1}$, $H_{S2}$), inventory item sizes ($S_{25}$, $S_{30}$), and maximum number of safely stacked items ($N_{max1}$, $N_{max2}$) associated with the position of each stack 35, 40 may be stored in a central database of a computing device (such as computing device 905 of computing environment 900 of FIG. 9) of the IMS 100. Alternatively or additionally, the standardized heights ($H_{S1}$, $H_{S2}$), inventory item sizes ($S_{25}$, $S_{30}$), and maximum number of safely stacked items ($N_{max1}$, $N_{max2}$) may be encoded on a marker (e.g., a bar code, RFID tag, or other marker) located at or adjacent to, the position of each stack 35, 40 within the warehouse 10 and read by a UAS 105 circulating within the warehouse 10 under the control of the IMS 100.

As illustrated, the IMS 100 may include a UAS 105 configured to move within the warehouse 10 and a real-time location system (RTLS) 130 configured to track the UAS 105. The UAS 105 is not particularly limited and may include a fixed wing drone, a quadcopter, hexacopter, octocopter, or any other UAS device that might be apparent to a person of ordinary skill in the art. Additionally, though the IMS 100 includes a UAS 105, example implementations are not limited to flying drones and may also include a ground-based drones (e.g., crawling drones, tracked drones, wheeled drones, or other ground-based drones that might be apparent to a person of ordinary skill in the art) and water-based drones (e.g., swimming drones, floating drones, submersible drones or other water-based drones that might be apparent to a person of ordinary skill in the art). In some example implementations, the drones may also serve other dual purposes such as moving stacks like forklifts or pallet carriers, in addition to performing inventory management functions. Additional aspects of the UAS 105 are discussed in greater detail below.

The UAS 105 may be configured to measure a current height $H_1$ or altitude of the UAS 105 relative to the ground 15 in real time. The altitude may be measured using onboard sensors such as Radio Direction and Ranging (RADAR), Light Detection and Ranging (LIDAR), Ultrasound, Stereometric cameras, Barometric altimeter, Global Positioning System (GPS) or any other altitude measuring system that might be apparent to a person of ordinary skill in the art. The UAS 105 may relay the measured height $H_1$ to a centralized computing device (such as computing device 905 of computing environment 900 of FIG. 9). Alternatively, the height $H_1$ or altitude may be measured using the RTLS 130 as discussed below and the measured height $H_1$ may be relied to the centralized computing device by the RTLS 130.

The RTLS 130 may include a plurality of antennas 110, 115, 120 distributed around the warehouse 10 to track and communicate with the UAS 105. In some example implementations, upper antennas 110 may be placed at a position above the top of stacks 35, 40 of inventory items 25, 30, such that the UAS 105 may pass below the upper antennas 110. In example implementations having a ceiling 20, the upper antennas 110 may be placed near the ceiling 20 of the warehouse 10.

Additionally, lower antennas 115 may be placed at a position near the ground 15 of the warehouse 10 such that the UAS 105 may pass over the lower antennas 115 in some example implementations. Further, intermediate antennas 120 may be placed at an intermediate position between the upper antennas 110 and the lower antennas 115. By providing a plurality of upper antennas 110, lower antennas 115, and intermediate antennas 120 distributed around the warehouse 10, the position of the UAS 105 may be tracked within the 3-dimensional volume of the warehouse 10 in real-time.

However, example implementations of the RTLS 130 may not require antennas 110, 115, 120 vertically offset at different heights within the warehouse 10. For example, antennas may be placed at a single height to allow tracking of the lateral position of the UAS 105 in two-dimensions, and the onboard sensors (e.g., RADAR, LIDAR, Ultrasound, Barometric altimeter, GPS or any other altitude measuring system) of the UAS 105 may provide the vertical (e.g., altitude ($H_1$). After the UAS 105 has been calibrated with a height $H_1$ or altitude relative to the ground 15, the UAS 105 may then measure the height of the stacks 35, 40 as discussed below.

Figure 2:
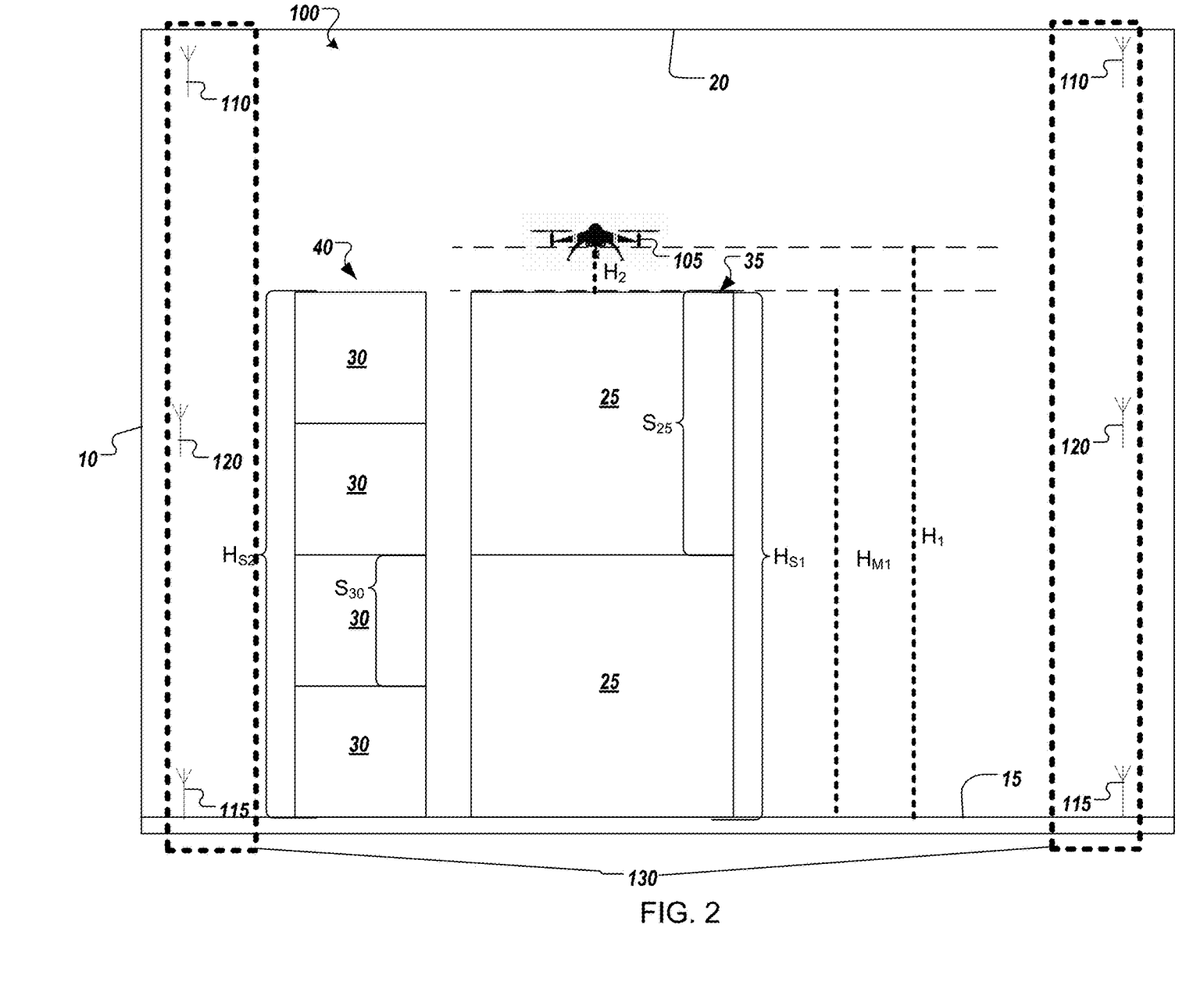
FIG. 2 illustrates another schematic representation of the inventory management system illustrated in FIG. 1.

FIG. 2 illustrates another schematic representation of the inventory management system (IMS) 100 illustrated in FIG. 1. In FIG. 2, the UAS 105 has been repositioned above the stack 35 of the inventory items 25 without changing the altitude or height of the UAS 105 relative to the ground 15. Once repositioned, the UAS 105 may use a range finding sensor (e.g., a RADAR sensor, a LIDAR sensor, an ultrasound sensor, stereo metric cameras, or other range finding sensor) to measure the UAS 105 height $H_2$ or vertical position above the stack 35 of inventory items 25.

The UAS 105 may relay the measured height $H_2$ to the centralized computing device (such as computing device 905 of computing environment 900 of FIG. 9). Based on the measured UAS 105 height $H_2$ above the stack 35 and the measured UAS 105 height $H_1$ (e.g., altitude) above the ground 15, a measured height $H_{m1}$ of the stack 35 may be determined using equation 3 below.

$$H_{M1} = H_1 - H_2 \quad \text{(equation 3)}$$

Once the measured height $H_{M1}$ of the stack 35 has been determined, the measured height $H_{M1}$ of the stack 35 may be compared to the standardized height $H_{S1}$ of the stack 35 to determine if the stack 35 contains the maximum number ($N_{MAX1}$) of inventory items 25 associated with the stack 35. The standardized height $H_{S1}$ may be determined from information stored in the centralized computing device (e.g., computing device 905 of computing environment 900 of FIG. 9) based on the position of the UAS 105 within the warehouse 10 detected by the RTLS 130. For example, the IMS 100 may use the RTLS 130 to triangulate the position of the UAS 105 within the warehouse 10 and use information from an overhead inventory map, such as FIG. 5 discussed below, to identify the standardized height $H_{S1}$ associated with the UAS's 105 measured position.

If the measured height $H_{mi}$ is substantially equal to (within an tolerance range associated with the accuracy of the range finding sensor, for example), the standardized height $H_{S1}$ associated with the UAS's 105 position, the number of items in the stack 35 is determined to be the maximum number of safely stacked items (e.g., $N_{max1}$). By having the UAS 105 fly within the warehouse 10 along a predefined route (e.g., FIG. 5), the IMS 110 may count the number of full stacks ($N_s$) having a standardized height and determine an amount inventory items in the standardized stacks based on the known number of items that may be safely stacked ($N_{max}$) and the number of full stacks ($N_s$) counted. The IMS 110 may also detect and count partial stacks as illustrated in FIG. 3.

Figure 3:
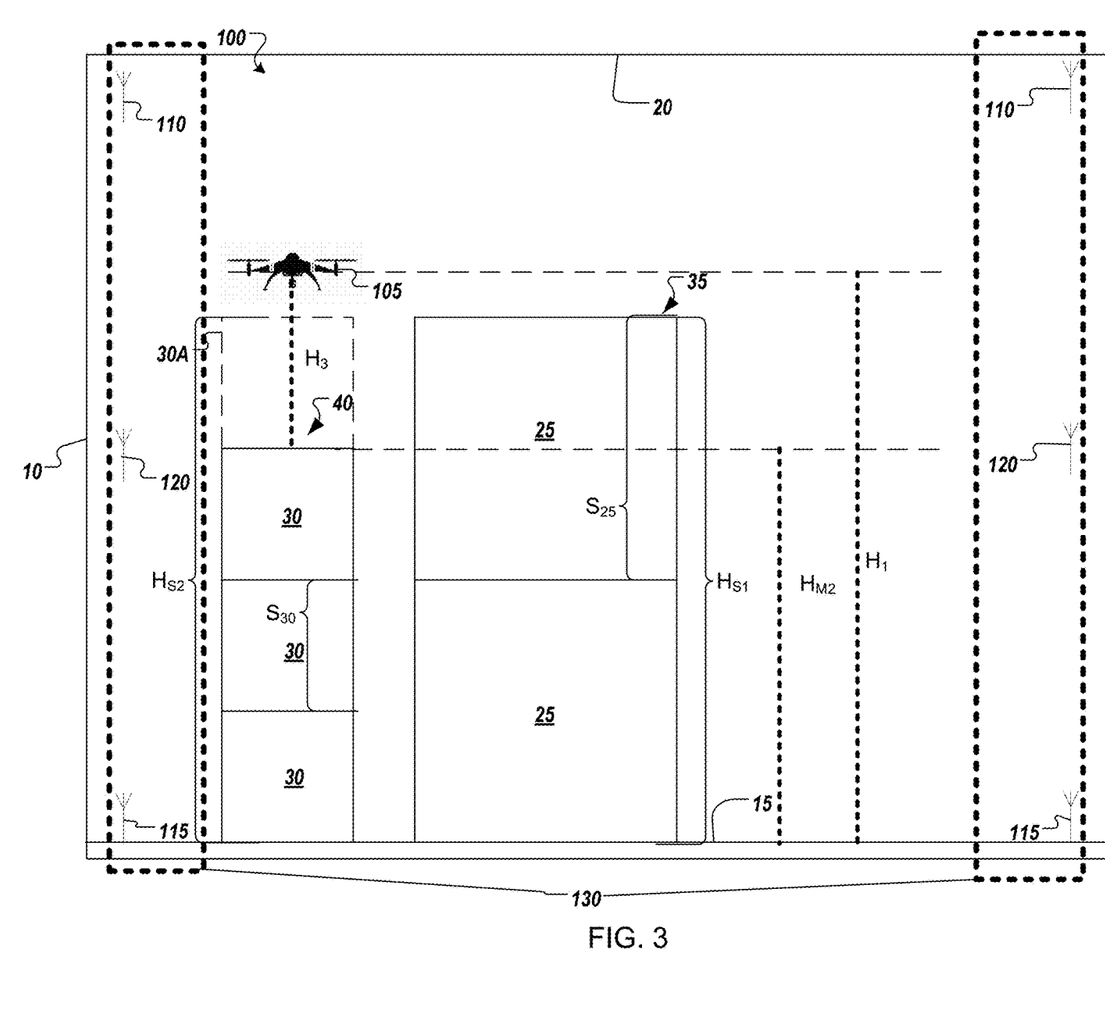
FIG. 3 illustrates another schematic representation of the inventory management system illustrated in FIGS. 1 and 2.

FIG. 3 illustrates another schematic representation of the inventory management system (IMS) 100 illustrated in FIGS. 1 and 2. In FIG. 3, the UAS 105 has been repositioned above the stack 40 of the inventory items 30 without changing the altitude or height ($H_1$) of the UAS 105 relative to the ground 15. Additionally, one of the inventory items 30 has been removed as indicated by broken line box 30A. Once repositioned, the UAS 105 may use a range finding sensor (e.g., a RADAR sensor, a LIDAR sensor, an ultrasound sensor, stereo metric cameras, or other range finding sensor) to measure the UAS 105 height $H_3$ or vertical position above the stack 40 of inventory items 30.

The UAS 105 may relay the measured height $H_3$ to the centralized computing device (such as computing device 905 of computing environment 900 of FIG. 9). Based on the measured UAS 105 height $H_3$ above the stack 40 and the measured UAS 105 height $H_1$ (e.g., altitude) above the ground 15, a measured height $H_{M2}$ of the stack 40 may be determined using equation 4 below.

$$H_{M2} = H_1 - H_3 \quad \text{(equation 4)}$$

Once the measured height $H_{M2}$ of the stack 40 has been determined, the measured height $H_{M2}$ of the stack 40 may be compared to the standardized height $H_{S2}$ of the stack 40 to determine if the stack 40 contains the maximum number of inventory items 30 associated with the stack 40. The standardized height $H_{S2}$ may be determined from information stored in the centralized computing device (e.g., computing device 905 of computing environment 900 of FIG. 9) based on the position of the UAS 105 within the warehouse 10 detected by the RTLS 130. For example, the IMS 100 may use the RTLS 130 to triangulate the position of the UAS 105 within the warehouse 10 and use information from an overhead inventory map, such as FIG. 5 discussed below, to identify the standardized height $H_{S2}$ associated with the UAS's 105 measured position.

If the measured height $H_{M2}$ is not substantially equal to (by an amount greater than a tolerance range associated with the accuracy of the range finding sensor, for example) the standardized height $H_{S2}$ associated with the UAS's 105 position, the number of items ($N_{S2}$) in the stack 35 may be determined based on the standard size ($S_{30}$) associated with inventory item 30 using Equation 5 below.

$$N_{S2} = H_{M2}/S_{30} \qquad \text{(equation 5)}$$

By having the UAS 105 fly within the warehouse 10 along a predefined route (e.g., FIG. 5), the IMS 110 may count the number of inventory items in partial stacks. The number of inventory items in partial stacks may be combined with the number of inventory items in complete stacks by the IMS 110 to determine a complete inventory of the warehouse 10.

Figure 4:
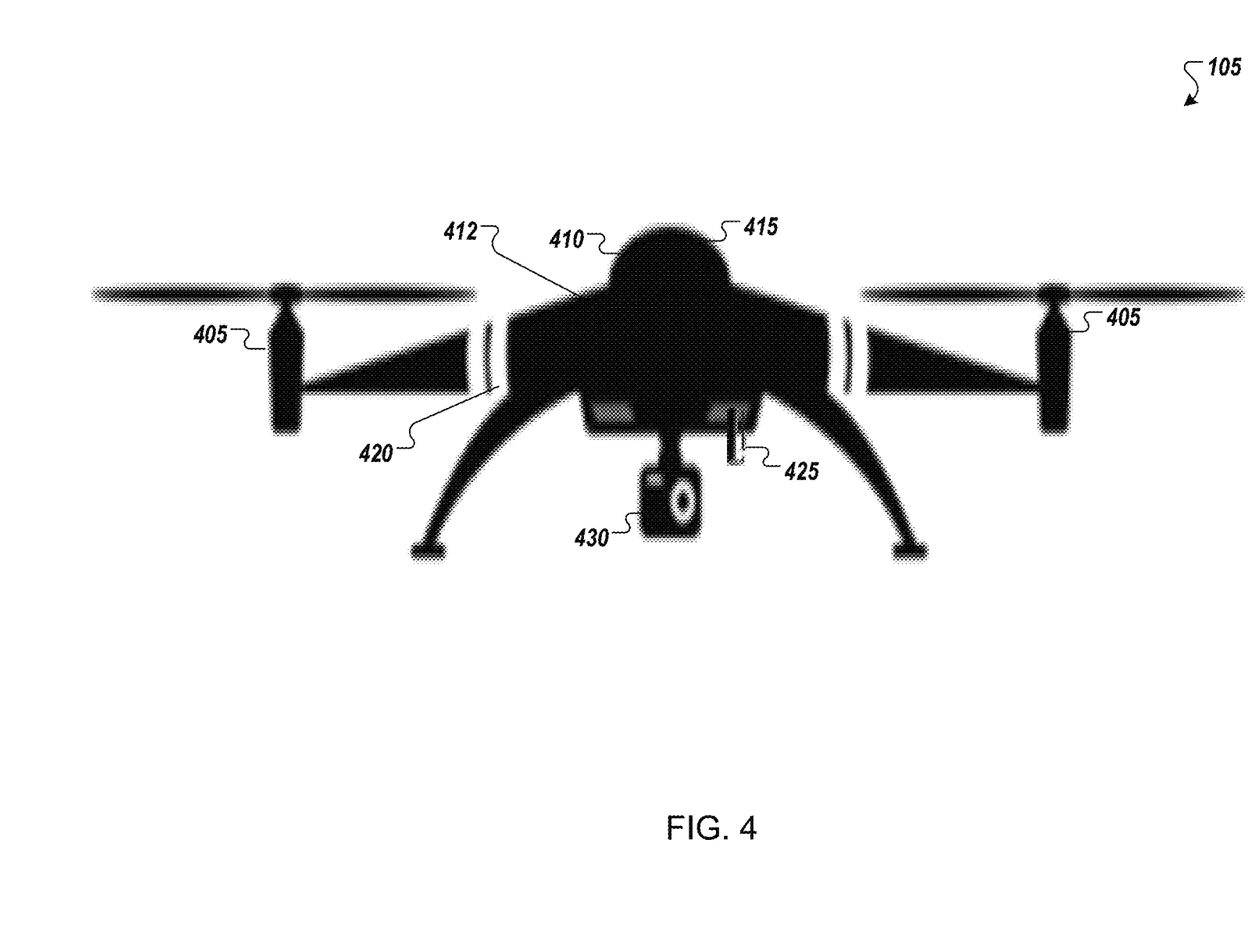
FIG. 4 illustrates a schematic representation of an unmanned aerial system in accordance with example implementations of the present application.

FIG. 4 illustrates a schematic representation of the UAS 105 in accordance with example implementations of the present application. As discussed above, the UAS 105 may include a fixed wing drone, a quadcopter, hexacopter, octocopter, or any other UAS device that might be apparent to a person of ordinary skill in the art. Additionally, though the IMS 100 includes a UAS 105, example implementations are not limited to flying drones and may also include a ground-based drones (e.g., crawling drones, tracked drones, wheeled drones, or other ground-based drones that might be apparent to a person of ordinary skill in the art) and water-based drones (e.g., swimming drones, floating drones, submersible drones or other water-based drones that might be apparent to a person of ordinary skill in the art).

As illustrated, the UAS 105 includes a propulsion system 405 configured to generate lift and allow the UAS 105 to maneuver within an warehouse 10 as illustrated in FIGS. 1-3 above. In some, implementations, the propulsion systems 405 may include one or more variable pitch propellers configured to provide vertical thrust and/or horizontal thrust sufficient to lift the UAS 105 off of the ground and maneuver within the warehouse 10. In other example implementations, the propulsion systems 405 may include a turbine thruster or other propulsion mechanism that might be apparent to a person of ordinary skill in the art. Additionally, the propulsion system may also be coupled with wings to assist in lift generation.

The UAS 105 may also include a wireless data link 410 configured to allow data transfer between the UAS 105 and a central computing device (e.g., computing device 905 of computing environment 900 of FIG. 9) of the IMS 100. The wireless data link 410 may be a cellular transceiver, a WI-FI transceiver, a Bluetooth transceiver, or any other type of data link that might be apparent to a person of ordinary skill in the art. The Wireless data link 410 may allow the central computing device (e.g., computing device 905 of computing environment 900 of FIG. 9) to communicate with the central processor 412 that provides the onboard autonomous control and calculations for the UAS 105.

The UAS 105 may also include a RTLS beacon 415 configured to interact with the antennas 110, 115, 120 of the RTLS 130 illustrated in FIGS. 1-3. The RTLS beacon 415 may communicate with the antennas 110, 115, 120 to allow the RTLS 130 to triangulate the UAS's 105 position within the warehouse 10. In some example implementations, the RTLS 130 may use a Time Different of Arrival Technique (TDOA) to determine the beacon location. Using this technique, each antenna 110, 115, 120 may compare the differences in time-stamps received at each antenna to draw distance radials and where the distance radials intersect, the beacon 415 may be located. In other example implementations, the RTLS 130 may use an angle of arrival technique. In this technique, one or more antennas 110, 115, 120 may be directional antennas capable of detecting an angle from which a signal was received. The intersection point of angles detected by multiple directional antennas may be the detected location of beacon 415. In some example implementations, the beacon 415 may transmit a signal received by one or more of the antennas 110, 115, 120. In other example implementations, the beacon 415 may receive a signal transmitted by one or more of the antennas 110, 115, 120.

The UAS 105 also includes a pair of sensors 420, 425 that may be used to determine the altitude of the UAS 105 and distance from the UAS 105 to a structure beneath the UAS 105. In some example implementations, the sensor 420 may be an absolute altitude sensor such as a barometric altimeter, GPS sensor, or other sensor configured to detect an absolute altitude of the UAS 105 with respect to the ground. In these example implementations, the sensor 425 may be a range finding sensor, such as a RADAR range finder, a LIDAR range finder, an ultrasonic range finder or any other range finding sensors that might be apparent to a person of ordinary skill in the art, that can measure a distance between the UAS 105 and a structure below the UAS 105.

In other example implementations, the sensors 420, 425 may be separate range finding sensors (e.g., RADAR range finders, LIDAR range finders, ultrasonic range finders or any other range finding sensors that might be apparent to a person of ordinary skill in the art) offset at different angles to allow both altitude from ground and distance from a structure beneath the UAS 105 to be detected. In some example implementations, one or both of the sensors 420, 425 may be scanning range finders (e.g., RADAR range finders, LIDAR range finders, ultrasonic range finders or any other range finding sensors that might be apparent to a person of ordinary skill in the art) configured to scan in broad angles (e.g., 90° sweep, 180° sweep, 270° sweep, 360° sweep).

In some example implementations, the UAS 105 may also include an imaging device 430 such as a bar code reader, a video camera, a still camera or any other imaging device that might be apparent to a person of ordinary skill in the art. The imaging device 430 may be used to perform object recognition techniques to detect information associated with the inventory items. For example, the imaging device 430 may be used to perform character recognition to read labels or bar codes attached to inventory items to allow for item identification. The imaging device 430 may also perform object recognition to identify the inventory items based on a stored library of previously identified potential inventory items. The imaging device 430 may also include stereo metric cameras configured for performing volumetric measurements of inventory items and stacks of inventory items.

Figure 5:
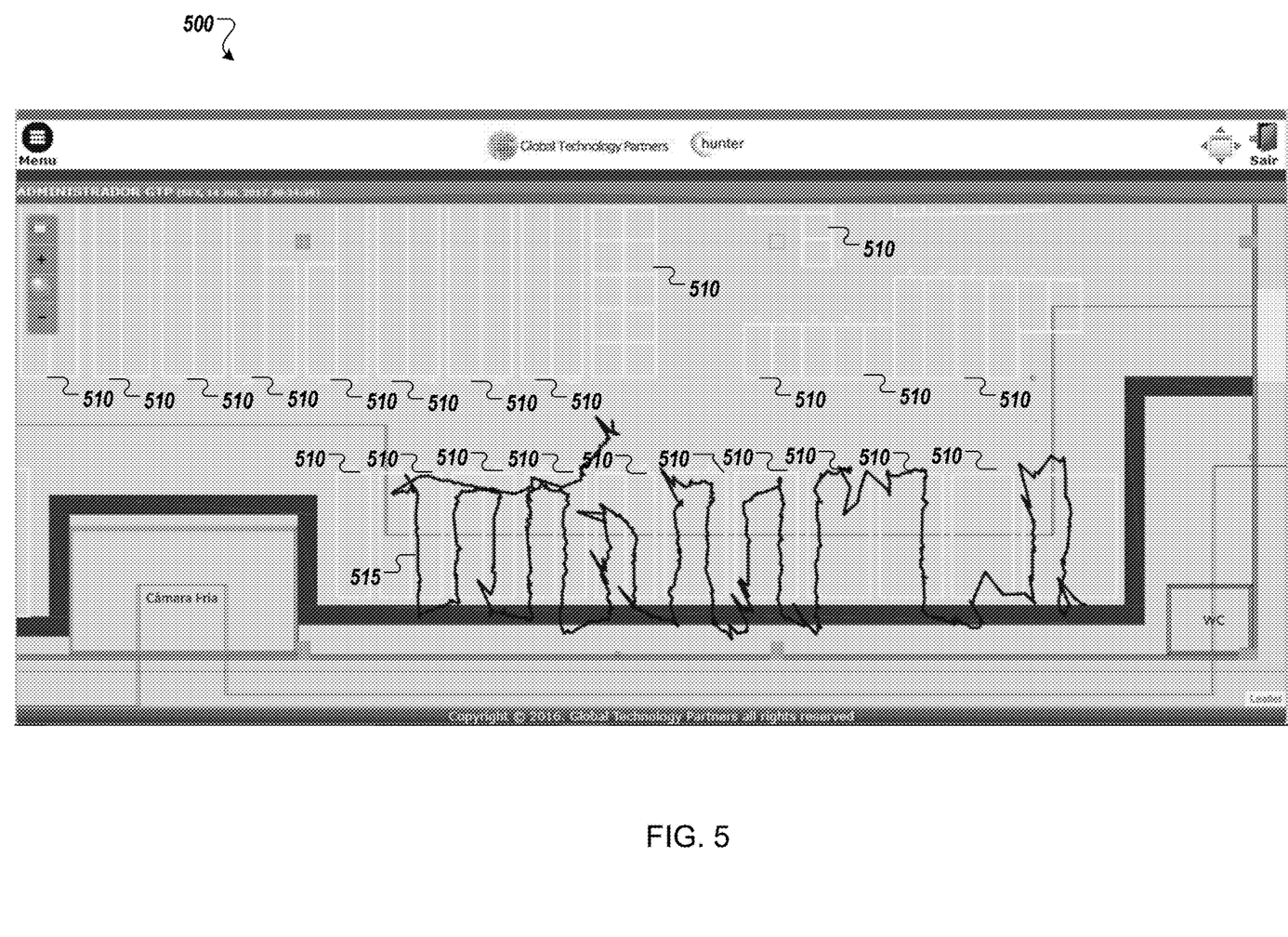
FIG. 5 illustrates an overhead map of an inventory management system in accordance with example implementations of the present application.

FIG. 5 illustrates an overhead map 500 of an IMS 100 in accordance with an example implementation of the present application. As illustrated, the overhead map 500 includes a plurality of rows 510 representing the rows of the stacks of the inventory goods found throughout the warehouse. Within each row 510, a plurality of stacks may be provided.

For each stack in each row, a standardized height value may be stored to distinguish a full or complete stack from a partial or incomplete stack, as discussed in greater detail above.

On the overhead map 500, a circuitous path 515 illustrates a flight path of the UAS 105 over the rows 510. The circuitous path 515 may be programmed into the UAS 105 to be followed on a regular schedule while the UAS 105 takes continuous range measurements using one or more of the sensors 420, 425 to determine the height of each of the stacks within each row 510 as the flight path 515 is followed.

Figure 6:
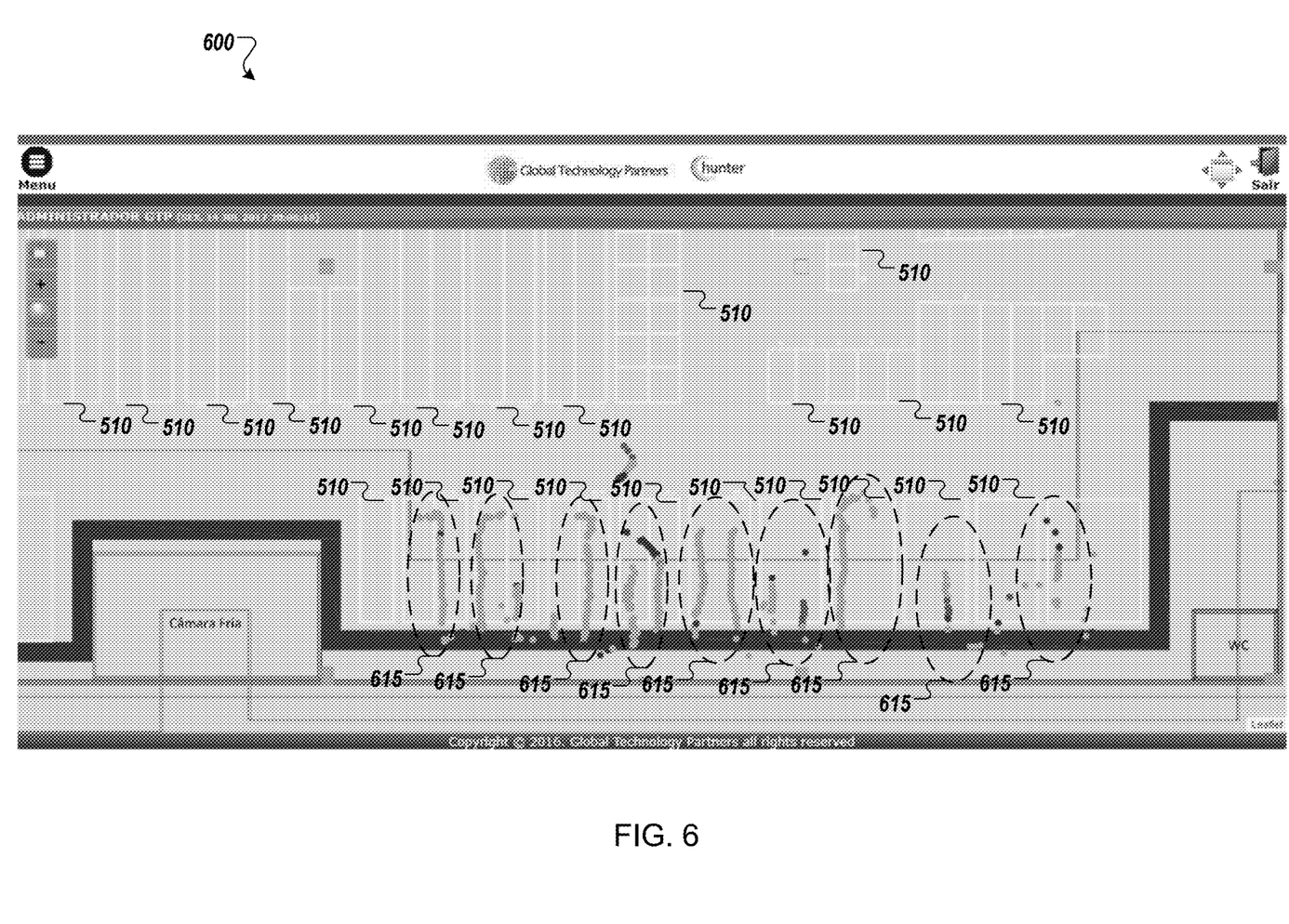
FIG. 6 illustrates another overhead map of an inventory management system in accordance with example implementations of the present application.

FIG. 6 illustrates another overhead map 600 of the IMS 100 in accordance with an example implementation of the present application. Similar to the overhead map 500 of FIG. 5, FIG. 6 illustrates that the overhead map 600 includes a plurality of rows 510 representing the rows of the stacks of the inventory goods found throughout the warehouse. FIG. 6 also illustrates a smoothed flight route, as the RTLS may include some noise in the location readings. Therefore, the system may perform filtering to remove the noise readings and keep only the "good readings" (as defined by an error threshold).

Again, within each row 510, a plurality of stacks may be provided and a standardized height value may be stored for each stack in each row 510. The standard height value may be used to distinguish a full or complete stack from a partial or incomplete stack, as discussed in greater detail above.

In FIG. 6, the circuitous path 515 representing the flight path of the UAS 105 over the rows 510 has been replaced by a series of grey and black dots 615. The grey and black dots 615 represent range measurements taken over the stacks within each row 510 using the one or more of sensors 420, 425 of the UAS 105. By capturing these range measurements during its flight path, the UAS 105 may determine the height of each of the stacks within each row 510 as the flight path 515 (of FIG. 5) is followed.

Figure 7:
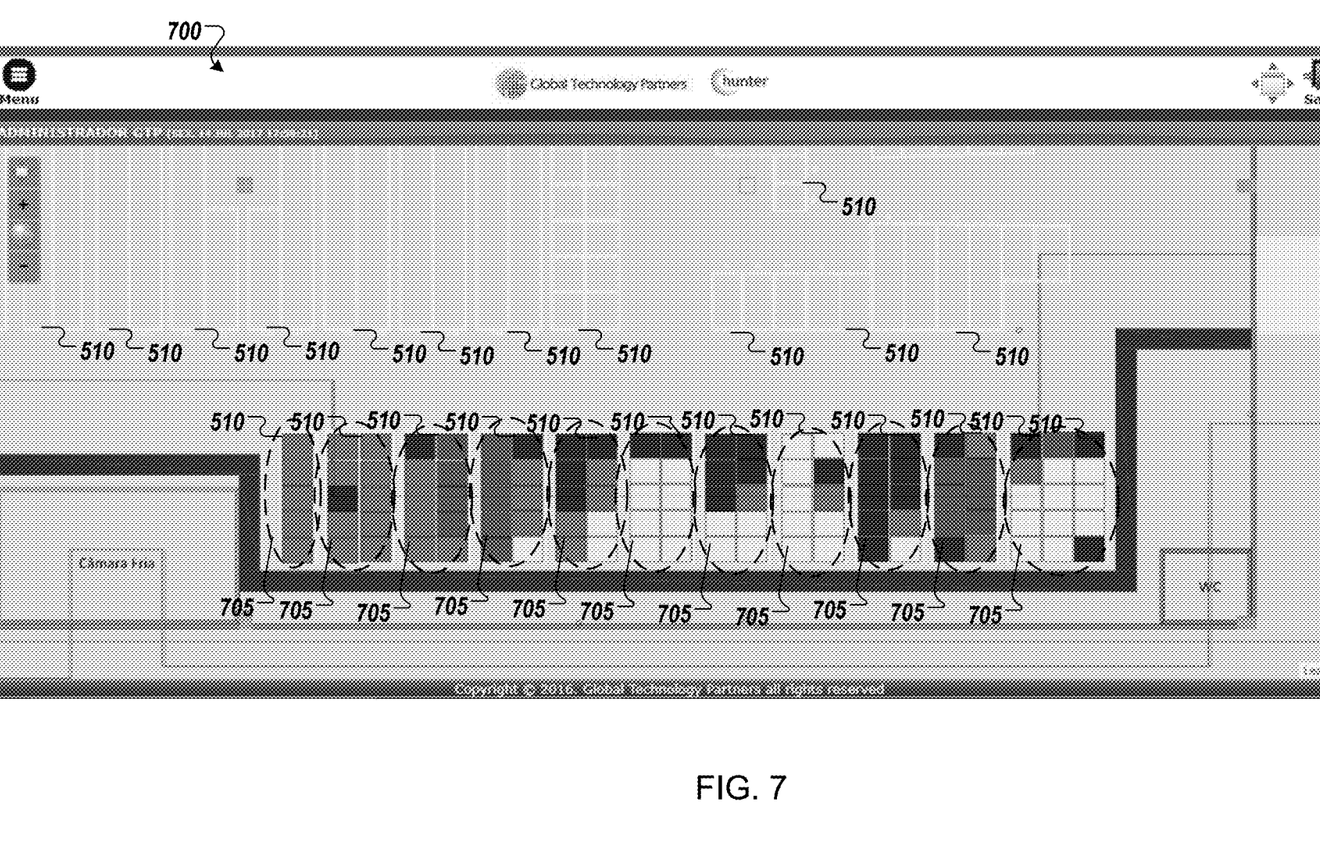
FIG. 7 illustrates an overhead inventory map of an inventory management system in accordance with example implementations of the present application.

FIG. 7 illustrates an overhead inventory map 700 of the IMS 100 in accordance with an example implementation of the present application. As with FIGS. 5 and 6, FIG. 7 illustrates that the overhead inventory map 700 includes a plurality of rows 510 representing the rows of the stacks of the inventory goods found throughout the warehouse. In FIG. 7, the range measurements 615 illustrated in FIG. 6 have been used to calculate stack heights and are illustrated by shaded squares 705. Each of the shaded squares 705 corresponds to one of the stacks in each row 510. The darkness of the square 705 may correspond to a height of the corresponding stack in each row. For example, a darker square 705 may represent a lower height and a smaller number of inventory items in that stack. Similarly, a lighter square 705 may represent a greater height and a larger number of inventory items in that stack.

Figure 8:
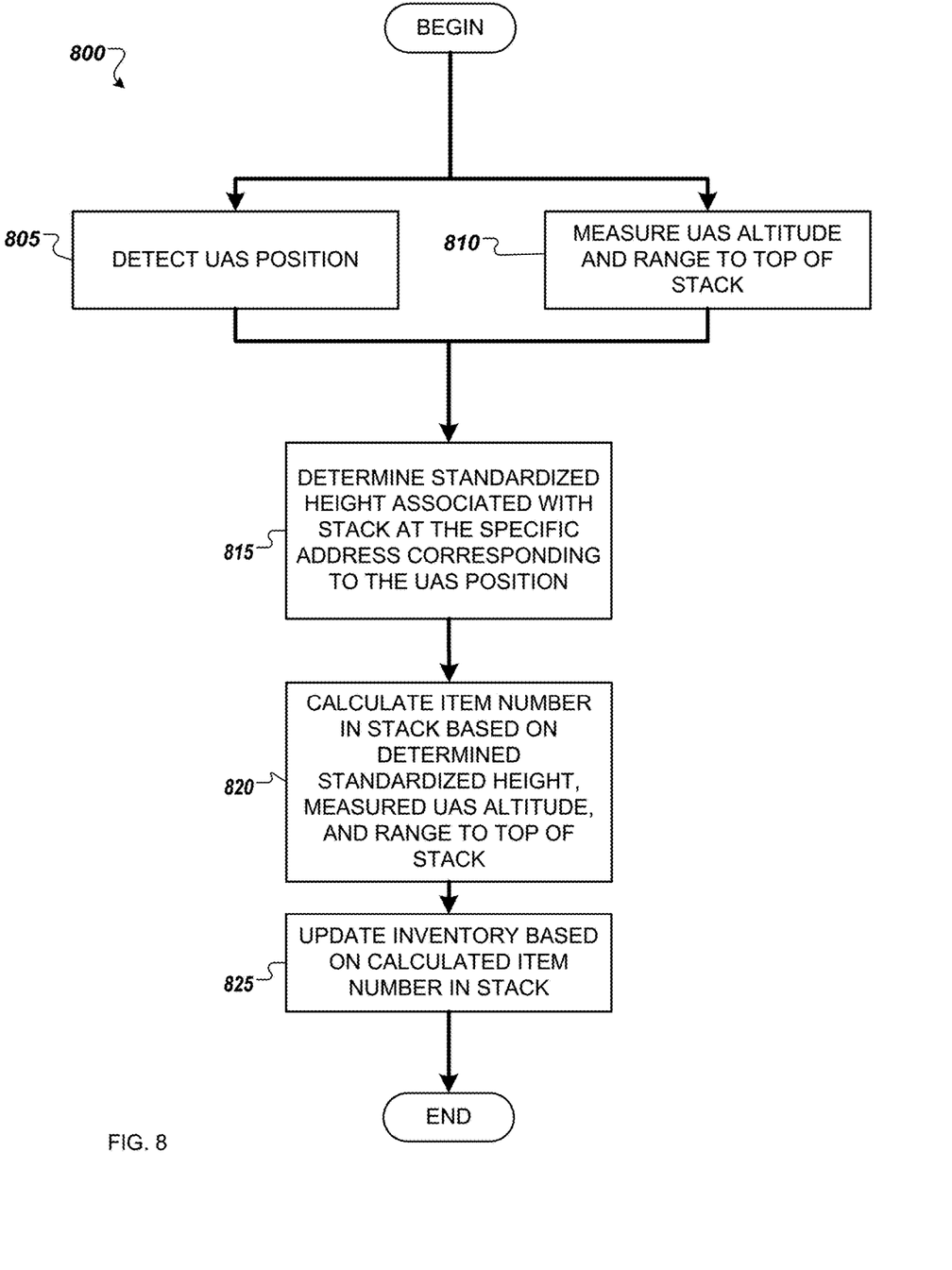
FIG. 8 illustrates a flowchart of a process for updating an inventory in accordance with example implementations of the present application.

FIG. 8 illustrates flowchart of a process 800 for updating an inventory in accordance with example implementations of the present application. The process 800 may be performed using an IMS (such as IMS 100) featuring a UAS (such as UAS 105). In the process 800, the position of the UAS is detected at 805. The position of the UAS may be detected using an RTLS to triangulate the position of the UAS within a warehouse or other inventory storage area. The position of the UAS may also be detected using an onboard position sensor such as a GPS sensor or other positional sensor that might be apparent to a person of ordinary skill in the art.

In parallel with 805, the altitude (e.g., height above ground ($H_1$ in FIGS. 1-3) of the UAS and range (e.g., distance ($H_2$, $H_3$ in FIGS. 2-3)) from the UAS to the top of a stack may be determined at 810. In some example implementations, the altitude (e.g., $H_1$ in FIGS. 1-3) may be detected using an absolute altitude sensor such as a GPS sensor, barometric pressure sensor, or other altitude sensor. Additionally, the range (e.g., $H_2$, $H_3$ in FIGS. 2-3) to the top of the stack may be detected using a range sensor such as a RADAR sensor, LIDAR sensor, ultrasonic sensor, stereo metric sensor or other range sensor that might be apparent to a person of ordinary skill in the art. In other example implementations, the altitude (e.g., $H_1$ in FIGS. 1-3) and the range (e.g., $H_2$, $H_3$ in FIGS. 2-3) may be both calculated using a two or more range sensors RADAR sensor, LIDAR sensor, ultrasonic sensor, stereo metric sensor or other range sensor that might be apparent to a person of ordinary skill in the art offset at a defined angle. For example, a first LIDAR or RADAR sensor may pointed down to identify stack height and a second LIDAR or RADAR pointed around 30° off the stack height pallet height to get also the UAS altitude. If the UAS is flying over a stacked row, but next to a corridor, the 30 degree off-set sensor will point to the corridor, and by the triangle formula it allow calculation of the drone height without relying on an altitude sensor.

After 805 and 810, a standardized height (e.g., $H_{S1}$, $H_{S2}$ in FIGS. 1-3) associated with a stack of inventory items located at the detected position of the UAS 105 is determined at 815. In some example implementations, the standardized height (e.g., $H_{S1}$, $H_{S2}$ in FIGS. 1-3) may be determined by reading, by the UAS 105, a marker located at the detected position of the UAS 105. For example, an RFID tag, bar code, text panel, or other marker associated with the stack may be read by the UAS 105. In other example implementations, the standardized height (e.g., $H_{S1}$, $H_{S2}$ in FIGS. 1-3) may be determined by consulting a database of stored standardized heights for all stacks within the warehouse cross-referenced with the address or position of each stack. In some example implementations, a size (e.g., $S_{25}$, $S_{30}$ in FIGS. 1-3) of inventory items may also be determined at 815. The standard size (e.g., $S_{25}$, $S_{30}$ in FIGS. 1-3) of inventory items may also be determined by reading a marker located at the detected position of the UAS 105, or consulting a database of stored inventory item sizes. Alternatively, the standard size (e.g., $S_{25}$, $S_{30}$ in FIGS. 1-3) of the inventory items may be measured using stereo metric cameras mounted on the UAS 105, or any other size determination process that might be apparent to a person of ordinary skill in the art.

At 820, the number of items in the stack is calculated based on the determined standardized height (e.g., $H_{S1}$, $H_{S2}$ in FIGS. 1-3) of the stack, the measured altitude ($H_1$ in FIGS. 1-3) of the UAS and the measured range ($H_2$, $H_3$ in FIGS. 2-3) between the top of the stack and the UAS. For example, the actual height of the stack (e.g., $H_{M1}$, $H_{M2}$) may be calculated using equation 3 (e.g., $H_{M1}=H_1-H_2$) or equation 4 (e.g., $H_{M2}=H_1-H_3$). The calculated actual height of the stack (e.g., $H_{M1}$, $H_{M2}$) may be compared to the standardized height (e.g., $H_{S1}$, $H_{S2}$ in FIGS. 1-3) of the stack to determine if the stack contains the maximum number of inventory items associated with the stack.

If the actual height is substantially equal to (within an tolerance range associated with the accuracy of the range finding sensor, for example) the standardized height (e.g., $H_{S1}$, $H_{S2}$) associated with the UAS's position (such as $H_{M1}$ illustrated in FIG. 2), the number of items in the stack may be determined to be the maximum number of safely stacked items (e.g., $N_{max1}$, $N_{max1}$ discussed above). The maximum number of safely stacked inventory items (e.g., $N_{max1}$, $N_{max2}$) may also be determined by reading a marker located at the detected position of the UAS 105, or consulting a database of stored inventory item sizes.

Conversely, if the actual height is not substantially equal to (by an amount greater than a tolerance range associated with the accuracy of the range finding sensor, for example) the standardized height (e.g., $H_{S1}$, $H_{S2}$) associated with the UAS's position (such as $H_{M2}$ illustrated in FIG. 3), the number of items in the stack may be calculated based on the standard size standard size (e.g., $S_{25}$, $S_{30}$ in FIGS. 1-3) associated with inventory items in the stack. For example, equation 5 (e.g., $N_{S2}=H_{M2}/S_{30}$) discussed above may be used to calculate the number of inventory items in the stack.

Once the number of items in the stack is calculated, the inventory may be updated to reflect the calculated number of items in the stack at 825 and the process may end. In some example implementations, the process 800 may be repeated for every stack in a warehouse to determine a full inventory of warehouse.

Example Computing Environment

FIG. 9 illustrates an example computing environment 900 with an example computer device 905 suitable for controlling an IMS in accordance with some example implementations. Computing device 905 in computing environment 900 can include one or more processing units, cores, or processors 910, memory 915 (e.g., RAM, ROM, and/or the like), internal storage 920 (e.g., magnetic, optical, solid state storage, and/or organic), and/or I/O interface 925, any of which can be coupled on a communication mechanism or bus 930 for communicating information or embedded in the computing device 905.

Computing device 905 can be communicatively coupled to input/user interface 935 and output device/interface 940. Either one or both of input/user interface 935 and output device/interface 940 can be a wired or wireless interface and can be detachable. Input/user interface 935 may include any device, component, sensor, or interface, physical or virtual, which can be used to provide input (e.g., buttons, touch-screen interface, keyboard, a pointing/cursor control, microphone, camera, braille, motion sensor, optical reader, and/or the like). Output device/interface 940 may include a display, television, monitor, printer, speaker, braille, or the like. In some example implementations, input/user interface 935 and output device/interface 940 can be embedded with, or physically coupled to, the computing device 905. In other example implementations, other computing devices may function as, or provide the functions of, an input/user interface 935 and output device/interface 940 for a computing device 905.

Examples of computing device 905 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 905 can be communicatively coupled (e.g., via I/O interface 925) to external storage 945 and network 950 for communicating with any number of networked components, devices, and systems, including one or more computing devices of the same or different configuration. Computing device 905 or any connected computing device can be functioning as, providing services of, or referred to as a server, client, thin server, general machine, special-purpose machine, or another label.

I/O interface 925 can include, but is not limited to, wired and/or wireless interfaces using any communication or I/O protocols or standards (e.g., Ethernet, 802.11x, Universal System Bus, WiMAX, modem, a cellular network protocol, and the like) for communicating information to and/or from at least all the connected components, devices, and network in computing environment 900. Network 950 can be any network or combination of networks (e.g., the Internet, local area network, wide area network, a telephonic network, a cellular network, satellite network, and the like).

Computing device 905 can use and/or communicate using computer-usable or computer-readable media, including transitory media and non-transitory media. Transitory media includes transmission media (e.g., metal cables, fiber optics), signals, carrier waves, and the like. Non-transitory media included magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 905 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 910 can execute under any operating system (OS) (not shown), in a native or virtual environment. One or more applications can be deployed that include logic unit 955, application programming interface (API) unit 960, input unit 965, output unit 970, UAS position determination unit 975, Stack height calculation unit 980, Inventory update unit 985, and inter-unit communication mechanism 995 for the different units to communicate with each other, with the OS, and with other applications (not shown). For example, UAS position determination unit 975, Stack height calculation unit 980, and Inventory update unit 985 may implement the process shown in FIG. 8. The described units and elements can be varied in design, function, configuration, or implementation and are not limited to the descriptions provided.

In some example implementations, when information or an execution instruction is received by API unit 960, it may be communicated to one or more other units (e.g., logic unit 955, input unit 965, UAS position determination unit 975, Stack height calculation unit 980, and Inventory update unit 985). For example, the UAS position determination unit 975 may determine the UAS position (both lateral and vertical positions relative to ground and one or more stacks) and provide UAS position information to the Stack height calculation unit 980. Additionally, the Stack height calculation unit 980 may calculate a number of items in the stack based on the UAS position information and provide the number of items to the Inventory update unit 985. The Inventory update unit 985 may then update a warehouse inventory based on the number of items in the stack.

In some instances, the logic unit 955 may be configured to control the information flow among the units and direct the services provided by API unit 960, input unit 965, output unit 970, UAS position determination unit 975, Stack height calculation unit 980, and Inventory update unit 985 in some example implementations described above. For example, the flow of one or more processes or implementations may be controlled by logic unit 955 alone or in conjunction with API unit 960.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

I claim:

1. An inventory management system configured to manage a plurality of inventory items stored in a storage area, the inventory management system comprising:
   an autonomous vehicle configured to move within the storage area, the autonomous vehicle comprising:
      a beacon configured to facilitate detection of a current position of the autonomous vehicle based on signal triangulation,
      at least one sensor configured to detect information indicative of a number of inventory items at the current position of the autonomous vehicle, and
      a wireless data link configured to transmit a signal indicative of the number of inventory items;
   a computing device communicatively coupled to the beacon of the autonomous vehicle, the computing device being configured to facilitate detection of a position of the autonomous vehicle based on the beacon, and configured to update an inventory of the storage area based on the signal indicative of the number of inventory items,
   wherein the at least one sensor of the autonomous vehicle comprises:
      a range finding sensor configured to measure a height of a stack of inventory items; and
      an altitude finding sensor configured to measure an altitude of the autonomous vehicle relative to a ground,
   wherein the range finding sensor is configured to measure the height of the stack of inventory items by:
      measuring a vertical distance between the autonomous vehicle and the stack of inventory items; and
      calculate the height of the stack based on the measured vertical distance and the measured altitude of the autonomous vehicle, and
   wherein the inventory management system further comprises a processor programmed to calculate the number of inventory items only based on the measured height of the stack of inventory items and a standardized height of each of the inventory items.

2. The inventory management system of claim 1, further comprising:
   a real-time location system coupled to the computing device, the real-time location system comprising:
      at least one antenna configured to receive a signal indicative of the current position of the autonomous vehicle from the beacon and calculate the current position based on a strength of the signal indicative of the current position.

3. The inventory management system of claim 1, wherein the autonomous vehicle is a flying vehicle.

4. The inventory management system of claim 1, wherein the range finding sensor comprises at least one of:
   a RADAR range finder, a LIDAR range finder, and an ultrasonic range finder.

5. The inventory management system of claim 1, wherein the altitude finding sensor comprises at least one of:
   a barometric altimeter, a GPS sensor, a RADAR range finder, a LIDAR range finder, and an ultrasonic range finder.

6. The inventory management system of claim 1, wherein the autonomous vehicle comprises at least one reader device configured to capture information from a marker positioned adjacent an inventory item.

7. The inventory management system of claim 6, wherein the at least one reader device comprises one or more of:
   an RFID reader, a still camera, a video camera, and a pair of stereo metric cameras.

8. An autonomous vehicle configured to move within a storage area and provide updated counts of inventory items within the storage area, the autonomous vehicle comprising:
   a beacon configured to facilitate detection of a current position of the autonomous vehicle based on signal triangulation,
   at least one sensor configured to detect information indicative of a number of inventory items at the current position of the autonomous vehicle, and
   a wireless data link configured to transmit a signal indicative of the number of inventory items to a computing device communicatively coupled to the autonomous vehicle configured to update an inventory of the storage area based on the signal indicative of the number of inventory items,
   wherein the at least one sensor of comprises:
      a range finding sensor configured to measure a height of a stack of inventory items; and
      an altitude finding sensor configured to measure an altitude of the autonomous vehicle relative to a ground, and
   wherein the range finding sensor is configured to measure the height of the stack of inventory items by:
      measuring a vertical distance between the autonomous vehicle and the stack of inventory items; and
      calculate the height of the stack based on the measured vertical distance and the measured altitude of the autonomous vehicle, and
   wherein the number of inventory items is determined only based on the measured height of the stack of inventory items and a standardized height of each of the inventory items.

9. The autonomous vehicle of claim 8, wherein the autonomous vehicle is a flying vehicle.

10. The autonomous vehicle of claim 8, wherein the range finding sensor comprises at least one of:
   a RADAR range finder, a LIDAR range finder, and an ultrasonic range finder.

11. The autonomous vehicle of claim 8, wherein the altitude finding sensor comprises at least one of:
   a barometric altimeter, a GPS sensor, a RADAR range finder, a LIDAR range finder, and an ultrasonic range finder.

12. The autonomous vehicle of claim 8, wherein the autonomous vehicle comprises at least one reader device configured to capture information from a marker positioned adjacent an inventory item.

13. A method of performing an inventory of items stored within a storage area using an autonomous vehicle moving within the storage area, the method comprising:
- detecting, by a beacon, a position of the autonomous vehicle within the storage area;
- measuring, by at least one sensor, an altitude of autonomous vehicle and a distance between the autonomous vehicle and a stack of items stored within the storage area;
- calculating, by a processor, a number of items in the stack of items based on the measured altitude, the measured distance and the detected position of the autonomous vehicle;
- updating, by the processor, inventory records based on the calculated number of items in the stack; and
- determining, by the processor, a complete inventory of a warehouse by a result of the update of the inventory of the storage area,
- wherein the number of items is calculated by:
  - determining a standardized height of a stack associated with the detected position of the autonomous vehicle;
  - measuring a height of the stack based on the measured altitude and measured distance;
  - comparing the standardized height of the stack to the measured height of the stack; and
  - calculating a number of items in the stack only based on a comparison of the standardized height and the measured height.

* * * * *